Dec. 23, 1941.   H. M. PAULSEN   2,267,339
METHOD OF JOINING TUBES, RODS, OR THE LIKE
Filed Sept. 19, 1938
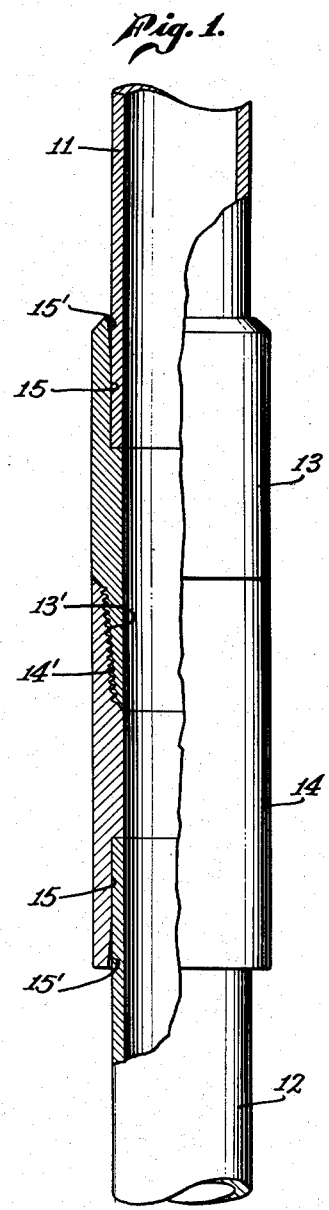
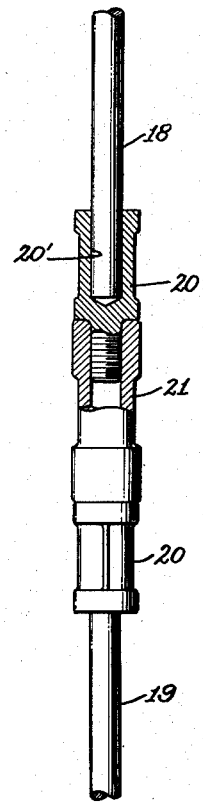
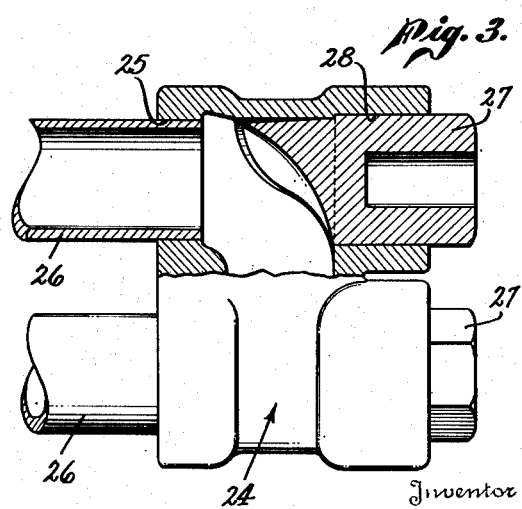
HENRY M. PAULSEN, Patented Dec. 23, 1941

2,267,339

UNITED STATES PATENT OFFICE 2,267,339

METHOD OF JOINING TUBES, RODS, OR THE LIKE

Henry M. Paulsen, Long Beach, Calif.

Application September 19, 1938, Serial No. 230,590

4 Claims. (Cl. 29—148)

This invention relates generally to the forming of joints of pipe, tubing, rods and the like and more particularly to methods of mounting a box or pin on the end of a plain ended pipe or rod.

The method of this invention is particularly designed for use in applying tool joints to rotary drill pipe such as is used for drilling oil wells and the invention will be described in this connection. However, it should be understood that the method is adaptable for use in joining or for forming joints on any tubular members or shafts or rods.

The ordinary tool joint employed for use in joining sections of rotary drill pipe comprises what is termed a box which is threadably mounted on the end of one section of pipe and a pin which is threadably mounted on the adjacent section of pipe which is to be joined to the first section. The box is provided with an outer internally threaded portion adapted to receive the externally threaded pin. The ordinary method of attaching a box or a pin to a section of drill pipe is to upset the pipe at its end in order to increase the thickness of the wall metal at that point so that threads may be cut therein without unduly weakening that particular portion. In order to form upsets at the ends of the pipe it is necessary to heat the pipe and by suitable machinery force it back on to itself to increase the wall thickness. Considerable heat is required to accomplish this operation since the metal must be raised to a temperature where with the action of pressure it will flow into the desired shape.

The disadvantage of upsetting the ends of the pipe is that it causes a change in the grain structure or internal structure of the pipe at that region which tends to weaken the pipe at that point and it has been found that the majority of drill pipe failures in drilling operations occur at or in the upset portion of the pipe.

Another disadvantage in the ordinary method of attaching a pin or box to the end of a section of drill pipe lies in the fact that the upset increases the external diameter of the pipe or decreases the internal diameter, depending on whether the pipe is externally or internally upset. The internally upset pipe reduces the capacity of the pipe for carrying rotary mud and this necessitates the use of excessive pressures in circulating the rotary mud. The externally upset drill pipe increases the outer diameter of the pipe and thereby reduces the clearance between the pipe and the casing or walls of the drill hole as the case may be. This is a disadvantage since there is an increased velocity and turbulence of the circulating rotary mud in the region of each joint and this is often sufficient to cut through the pipe. It is also true that it necessitates increased pump pressures.

In view of the above disadvantages of the ordinary type of tool joint, it is a primary object of this invention to provide a method of attaching a pin or box to a section of drill pipe which will eliminate the necessity of upsetting the pipe and thereby eliminate the disadvantages attendant upon such construction. In this connection, it is a particular object of this invention to provide a method of joining a pin or box to a section of plain ended drill pipe which will not reduce the internal diameter of the pipe and which will not enlarge the external diameter of the pipe. It is also an object of this invention to provide a method which will not change the grain structure or internal structure of the drill pipe and therefore will retain all the strength characteristics of the pipe.

It is a further object of this invention to provide a method for joining a pin or box to a plain ended section of drill pipe which will provide a stronger construction than the ordinary method of joining these two members. In this connection it is a further object to provide a method for joining a pin or box to a section of plain ended drill pipe which is less expensive than the ordinary method of doing this.

The ordinary construction of tool joint as indicated above involves the use of a threaded connection between the pin or box and each section of drill pipe. There is also a threaded connection between the pin and the box. The pin and box are heat treated to provide the desirable strength factors in those respective members so that the joint may be broken and made up several times at the point where the pin and box join. It has been found that with the ordinary method of joining the pins and boxes to the drill pipe that often the circulating fluid will escape through the threaded connection between the box or pin and the pipe section and many failures have been caused by this escape of rotary mud under pressure, the mud cutting out the joint by abrasive action.

It therefore is a further object of this invention to provide a method of joining a pin or box to a plain ended section of pipe which will eliminate the use of threads and which will provide a connection at this point which positively will not leak.

It is also an object of this invention to provide a method which may be used for attaching a coupling member, such as a pin or box, to the end of a rod such as the ordinary sucker rods used in oil well pumps, which will eliminate the use of any threaded connection between the rod and the attached member.

While it has been pointed out as an object to provide a method for attaching a pin or box to a section of plain ended drill pipe in order to produce a pipe tool joint which does not embody upset pipe, it should be understood that the method is applicable for attaching a pin or box to the end of an upset pipe where such is desirable.

It is a further object of this invention to provide a method of mounting the tubes of tube stills in the headers and bends of such devices. The ordinary method of doing this is to roll the tubes into the header although sometimes they are threadably connected. The excessive heat and pressure used in the modern tube still often causes leakage where the tubes enter the headers thus creating a fire hazard. It therefore is a particular object of this invention to provide a method of mounting the tubes in the headers to produce a joint which is leakproof and secure under the high pressures and high temperatures to which the joints are subjected.

These and other objects will be apparent from the drawing and the following description thereof. Referring to the drawing which is for illustrative purposes only;

Fig. 1 is an elevation partly in section of a tool joint produced by the method of this invention;

Fig. 2 is a fragmentary elevation partly in section of two sucker rods as they would appear when joined by the method of this invention; and Fig. 3 is an elevation partly in section of a header and a fragmentary portion of two tubes mounted therein.

More particularly describing the invention, the invention relates to a method of joining members, one of which fits inside of the other, comprising generally the heating of the outer member to expand the same and the cooling of the inner member to contract the same. In Fig. 1 there is shown a tool joint in which the pipe sections 11 and 12 are joined by means of a pin 13 and box 14 respectively. The pin 13 is provided with threads 13' which are adapted to engage threads 14' on the box and this portion of the joint is of the ordinary type.

Each of the pipe sections 11 and 12 is joined to the pin and box respectively by fitting the said sections into an enlarged bore or hole 15 which is provided at each end of the pin and box respectively. The holes 15 are preferably provided with flared end portions 15' to increase the flexibility of the joint and to prevent undue stress upon the pipe by the end of the pin or box.

In carrying out the method of this invention, using the box 14 and the pipe 12 as an example, the end of the pipe 12 which is to fit within the box is first machined to provide a smooth outer surface thereon. The internal surface of the bore 15 of the box 14 is also machined to provide a smooth surface. The finished end of the pipe 12 is slightly larger in cross-sectional area than the hole 15 in the box. With this construction it is impossible to force the pipe 12 into the box 14 when both members are at the same temperature.

In order to accomplish the insertion of the end of the pipe into the box, the end of the pipe is shrunk and the box expanded until this operation is possible. To shrink the end of the pipe, the pipe is cooled by packing in the end thereof or around the end thereof a refrigerating medium. The preferable refrigerating medium to be used is solidified $CO_2$, having a temperature of approximately 110° F., commonly known as dry ice. Solidified $CO_2$ will reduce the temperature of the end of the pipe to approximately —100° F. or even lower. The box is heated in any suitable manner so as not to weaken or change the internal structure of the material of the box. It may only be necessary to heat the box to from 350° to 700° F.

After the end of the pipe has been shrunk and the box has been expanded sufficiently to allow of the easy insertion of the pipe into the box, this operation is performed and the temperatures of the two members are allowed to equalize.

The refrigerating medium may be removed immediately before the pipe is inserted in the box if desirable. However, with the use of solidified $CO_2$, this refrigerating medium may be left within the pipe when it is inserted in the box since the solid $CO_2$ turns directly to gas and there is no objection to this procedure. The use of the solidified $CO_2$ is advantageous for the reason that it is cheap, non-combustible, non-toxic and that it is refrigerating medium of extremely low temperature available for use both in the shop and in the field.

As a practical embodiment of the invention, the following example will be given, although it should be understood that the dimensions and temperature limitations therein are merely suggestive and the invention is not necessarily limited thereto. Using as an example a 4½" outer diameter pipe, this pipe is first machined by taking a very fine cut across its surface for a length of approximately 12" at one end. This produces a true circular form and insures a fairly smooth surface, free from scale and other irregularities.

A tool joint box forging adapted to accommodate the end of the pipe is machined to have an internal diameter of .010" less than the outer diameter of the machined end of the pipe.

The tool joint is then heated to approximately 500° and this increases the inner diameter of the bore therein to a point where it exceeds the outer diameter of the pipe by approximately .005". Solidified $CO_2$ is packed in the pipe or around it and this increases the above clearance to approximately .010" by shrinking the pipe. The end of the pipe is then inserted in the box and the two members allowed to equalize in temperature.

With the method outlined above there is provided a tool joint construction which has been found to be as strong as the best type of tool joint which utilizes the upset pipe. With the method outlined herein a tool joint may be provided which is much cheaper to construct inasmuch as plain ended pipe sections may be used and directly connected to the pin or box without the use of threads and without the necessity of upsetting the pipe and cutting threads on the upset portion. No threads need be cut into the pin or box either.

In Fig. 2 there is shown a sucker rod joint in which two sucker rods 18 and 19 are provided with threaded pins 20 which are adapted to fit within a standard coupling 21. In this form of the invention the pins 20 are fastened to the rod by the same method as described in connection with the construction shown in Fig. 1, with the exception that since the rod is solid it cannot be packed internally with refrigerating medium and the end of the rod therefore must necessarily be immersed or packed in a refrigerating medium and removed therefrom before it is inserted in the pin. The pin is heated in the usual manner so that it will readily accommodate the rod when it is contracted by the low temperature.

The rod and pin are each provided with smooth machined faces before the operation of heating the pin and cooling the rod, the external cross-sectional area of the end of the rod slightly exceeding the cross-sectional area of the hole 20' which is provided in the pin for the reception of the rod.

With the method outlined above it should be apparent that an extremely tight bond or connection is provided between in one case the pin or box and the end of a drill pipe and in the other case between the rod and the pin. In this connection it should be apparent that the outer member exerts a compressive force on the inner member and the inner member exerts an expansive force against the outer member. So long as the two members are kept at substantially the same temperature an extremely strong bond or joint is in effect between the two.

In Fig. 3 there is shown a header generally indicated by reference numeral 24 which is provided with openings 25 for the accommodation of the tubes 26 of a tube still. The method heretofore described of inserting a tubular member into a member having a bore therein to accommodate said tubular member is applicable to this construction and when used provides a tight fitting between the tube and the header which will hold and be leak proof at the high pressures and temperatures existent in tube stills. The plugs 27 may also be mounted in the bores 28 of the headers 24 in the same manner as heretofore described in connection with the form of the invention shown in Fig. 1.

It should also be apparent that this invention is applicable for use as a method of joining two members where it is desired to have one member inserted in the other member and a tight fit achieved between the two in the region of their overlapping portions.

While the invention has been particularly shown with reference to joint members which are circular in cross section it is contemplated that the method is entirely suitable for joining members which are square, hexagonal or even irregularly shaped so long as the irregularity is coincidental in each member. Thus, an inner member having a square end thereon might be joined to an outer member having a square opening therein.

The method is also applicable to use in joining members where either due to the character of the material or to the desire to achieve a greater pressure of the members against each other at the overlapping region, it may be practicable to heat the outer member to an extremely high temperature and to cool the inner member to an extremely low temperature. Where an extremely low temperature is desired liquid air might be used, for example.

Although the invention has been described in connection with particular constructions and while particular dimensions have been given, it is not intended to thereby limit the invention, but it is intended to cover such modifications as come within the scope of the claims.

I claim as my invention:

1. A method of joining an inner and an outer member, said outer member having a hole therein for the reception of the end of the inner member, the cross-sectional area of said hole being less than the cross-sectional area of the end of the inner member, which comprises heating the outer member to over 350° F., cooling the end of the inner member to approximately −100° F., and inserting the cooled end of the inner member in the hole in the outer member and permitting the two members to equalize in temperature.

2. A method of mounting a fitting on the end of a member, which comprises forming a hole in said fitting so that said hole has a cross-sectional area slightly less than the cross-sectional area of the end of the member to be inserted therein, heating the fitting to over 350° F., cooling the end of said member to approximately −110° F., and inserting the cooled end of said member in said hole and permitting the heated fitting and cooled end of said member to equalize in temperature.

3. A method of mounting a fitting on the end of a member which comprises forming a hole in said fitting so that said hole has a cross-sectional area slightly less than the cross-sectional area of the end of the member to be inserted therein, forming a smooth surface on the wall of said hole and on the end of said member, heating the fitting to over 350° F., cooling the end of said member to approximately −100° F., and inserting the cooled end of said member in said hole and permitting the heated fitting and cooled end of the member to equalize in temperature.

4. A method of joining an inner and an outer metal member, said outer member having a bore therein for the reception of the end of the inner member, the cross sectional area of said hole being less than the cross sectional area of the end of the inner member, which comprises moderately heating the outer member, cooling the end of the inner member to approximately −100° F. and inserting the cooled end of the inner member in the hole in the outer member and permitting the two members to equalize in temperature.

HENRY M. PAULSEN.